United States Patent
Daniel et al.

(10) Patent No.: US 7,155,863 B2
(45) Date of Patent: Jan. 2, 2007

(54) FLUSH-MOUNTED SLIDER WINDOW FOR PICK-UP TRUCK INCLUDING SEAL CARRIER, BULB SEAL AND/OR APPLIQUE

(75) Inventors: Kevin M. Daniel, Lancaster, KY (US); Robert V. Himebaugh, Findlay, OH (US); Mark A. Schreiner, Tiffin, OH (US); Andrew T. Billiu, Farmington Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/804,202

(22) Filed: Mar. 19, 2004
(Under 37 CFR 1.47)

(65) Prior Publication Data
US 2005/0044798 A1 Mar. 3, 2005

Related U.S. Application Data

(63) Continuation-in-part of application No. 10/653,412, filed on Sep. 3, 2003.

(51) Int. Cl.
*E05D 15/06* (2006.01)
(52) U.S. Cl. .......................... 49/413; 49/209; 49/449; 292/DIG. 6
(58) Field of Classification Search .................. 49/413, 49/498.1, 475.1, 209, 212, 213, 449, 379, 49/496.1, 500.1; 292/32, DIG. 6, 36, 137, 292/139, 156, 158, DIG. 44, DIG. 20, 167, 292/163
See application file for complete search history.

(56) References Cited

U.S. PATENT DOCUMENTS

| | | | |
|---|---|---|---|
| 480,148 A | 8/1892 | Theby | |
| 705,260 A | 7/1902 | Lodor | |
| 820,960 A * | 5/1906 | Erb | 49/209 |
| 890,626 A | 6/1908 | Edwards | |
| 1,087,577 A | 2/1914 | Gervais | |
| 2,124,970 A | 7/1938 | Bagley | |
| 2,317,312 A * | 4/1943 | Swanson et al. | 49/130 |
| 2,768,852 A * | 10/1956 | Hicks | 292/175 |
| 2,967,335 A * | 1/1961 | Zitomer | 49/450 |
| 3,003,202 A * | 10/1961 | Mendelsohn | 49/503 |
| 3,122,797 A * | 3/1964 | Valfredo | 49/450 |
| 3,129,470 A * | 4/1964 | Schneider | 49/450 |
| 3,173,180 A * | 3/1965 | Dean | 52/211 |
| 3,359,688 A * | 12/1967 | Kondolf | 49/490.1 |
| 3,786,599 A | 1/1974 | Galbarzyk et al. | |

(Continued)

OTHER PUBLICATIONS

U.S. Appl. No. 10/653,412, filed Sep. 3, 2003.

*Primary Examiner*—Gregory J. Strimbu
(74) *Attorney, Agent, or Firm*—Nixon & Vanderhye P.C.

(57) ABSTRACT

A window structure which may be used as a rear window in a pick-up truck or the like. In certain example embodiments, the window structure includes a slidable window panel or sheet located between a pair of fixed window panels or sheets. The slidable window panel may be approximately flush with the fixed panels when in the closed position, but not in the opened position. A seal carrier may be supported by the sliding window, and a bulb seal may be supported by at least the seal carrier so as to cover gap(s) adjacent an edge of the sliding window panel. A latch assembly is provided including spring biased pins adapted to laterally slide in the tracks of upper and lower frame members, respectively, during opening and closing of the slidable window panel.

13 Claims, 8 Drawing Sheets

U.S. PATENT DOCUMENTS

| | | |
|---|---|---|
| 3,967,859 A | 7/1976 | Whisler |
| 4,124,054 A | 11/1978 | Spretnjak |
| 4,317,312 A | 3/1982 | Heideman |
| 4,486,980 A | 12/1984 | O'Bar |
| 4,660,325 A | 4/1987 | Bauer et al. |
| 4,819,377 A | 4/1989 | Bauer et al. |
| 4,850,139 A | 7/1989 | Tiesler |
| 4,858,385 A * | 8/1989 | Bright ........................ 49/490.1 |
| 4,889,175 A | 12/1989 | Frey et al. |
| 4,920,698 A | 5/1990 | Friese et al. |
| 4,924,625 A | 5/1990 | Dilcher |
| 5,042,855 A | 8/1991 | Bennett et al. |
| 5,072,464 A * | 12/1991 | Draheim et al. ............... 5/93.1 |
| 5,261,721 A | 11/1993 | Conger et al. |
| 5,294,168 A | 3/1994 | Kronbetter |
| 5,331,767 A * | 7/1994 | Takeuchi et al. ........... 49/490.1 |
| 5,442,880 A | 8/1995 | Gipson |
| 5,505,023 A | 4/1996 | Gillen et al. |
| 5,511,257 A * | 4/1996 | Hannes ........................... 5/100 |
| 5,522,191 A | 6/1996 | Wenner et al. |
| 5,542,214 A | 8/1996 | Buening |
| 5,581,943 A | 12/1996 | Deren et al. |
| 5,581,951 A * | 12/1996 | Ryan et al. ................. 49/498.1 |
| 5,595,025 A | 1/1997 | MacPhail-Fausey |
| 5,613,322 A | 3/1997 | Kobrehel |
| 5,617,675 A | 4/1997 | Kobrehel |
| 5,623,785 A | 4/1997 | Mariel |
| 5,647,094 A | 7/1997 | Mariel |
| 5,657,580 A | 8/1997 | Kobrehel |
| 5,724,771 A * | 3/1998 | Gipson ........................... 49/449 |
| 5,749,174 A | 5/1998 | Mariel |
| 5,775,029 A | 7/1998 | Buening |
| 5,784,832 A | 7/1998 | LeeVan |
| 5,784,833 A | 7/1998 | Sponable et al. |
| 5,791,700 A | 8/1998 | Biro |
| 5,799,444 A | 9/1998 | Freimark et al. |
| 5,799,449 A * | 9/1998 | Lyons et al. .............. 52/204.51 |
| 5,822,922 A | 10/1998 | Grumm et al. |
| 5,832,667 A | 11/1998 | Buening et al. |
| 5,836,110 A | 11/1998 | Buening |
| 5,864,987 A | 2/1999 | Mariel et al. |
| 5,996,284 A | 12/1999 | Freimark et al. |
| 6,026,611 A | 2/2000 | Raiston et al. |
| 6,038,819 A | 3/2000 | Klein |
| 6,103,168 A * | 8/2000 | Kelly ........................ 264/259 |
| 6,119,401 A | 9/2000 | Lin et al. |
| 6,123,383 A | 9/2000 | Doerflinger et al. |
| 6,125,587 A | 10/2000 | Woods |
| 6,216,392 B1 * | 4/2001 | DiGinosa ..................... 49/183 |
| 6,223,470 B1 | 5/2001 | Millard et al. |
| 6,393,766 B1 * | 5/2002 | Nozaki et al. ............. 49/498.1 |
| 6,409,256 B1 * | 6/2002 | Page ..................... 296/203.03 |
| 6,416,113 B1 * | 7/2002 | Page ...................... 296/146.2 |
| 6,539,669 B1 | 4/2003 | Heidrich et al. |
| 6,591,552 B1 | 7/2003 | Rasmussen |
| 6,740,390 B1 * | 5/2004 | Randazzo ................... 428/122 |
| 6,902,224 B1 | 6/2005 | Weinert et al. |
| 6,955,009 B1 | 10/2005 | Rasmussen |
| 6,968,648 B1 | 11/2005 | Bourque et al. |
| 7,003,916 B1 | 2/2006 | Nestell et al. |
| 2002/0003356 A1 | 1/2002 | Davis et al. |
| 2002/0148163 A1 | 10/2002 | Warner et al. |
| 2003/0188487 A1 | 10/2003 | Rasmussen |

\* cited by examiner

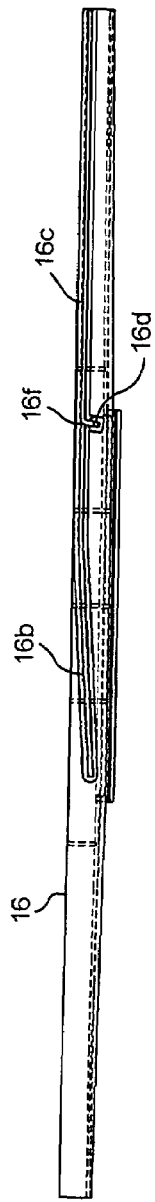
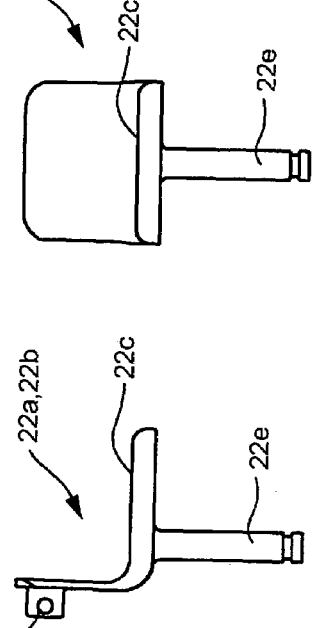
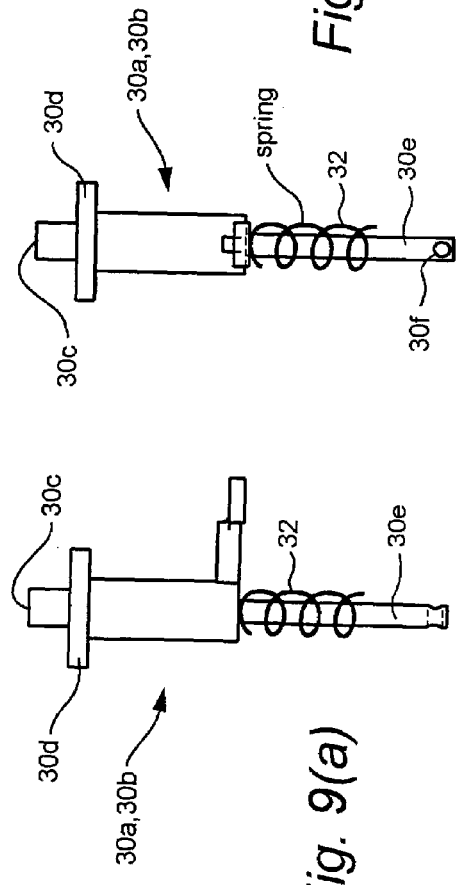
Fig. 7
Fig. 8(a)  Fig. 8(b)
Fig. 9(a)  Fig. 9(b)

US 7,155,863 B2

FLUSH-MOUNTED SLIDER WINDOW FOR PICK-UP TRUCK INCLUDING SEAL CARRIER, BULB SEAL AND/OR APPLIQUE

This application is a continuation-in-part (CIP) of U.S. patent application Ser. No. 10/653,412, filed Sep. 3, 2003, the entire disclosure of which is hereby incorporated herein by reference.

This invention relates to a slidable window which may be used as a rear window in a pick-up truck, heavy truck sleeper applications, or in any other suitable application. Certain example embodiments of this invention relate to a substantially flush-mounted slidable window for use as a rear window in a pick-up truck, wherein the window includes a pair of fixed window sheets and a slidable window sheet provided therebetween.

BACKGROUND OF THE INVENTION

Rear windows for pick-up trucks, which have a slidable window sheet, are known in the art. For example, see U.S. Pat. Nos. 5,542,214, 5,996,284, 5,522,191, 4,124,054, and the like. However, the windows of the aforesaid patents each have their respective problems.

The instant invention relates to an improved slidable window for use in a pick-up truck or the like. In certain example embodiments, the instant invention relates to a window structure that includes a pair of fixed window sheets and a slidable window sheet provided therebetween.

SUMMARY OF EXAMPLE EMBODIMENTS OF INVENTION

Certain example embodiments of this invention relate to a window structure for use as a rear window in a pick-up truck or the like. In certain instances, the window structure may include a slidable window panel or sheet located between a pair of fixed window panels or sheets. The slidable window panel may be approximately flush with the fixed panels when in the closed position. However, when the slidable window panel is opened, it may be moved toward the vehicle interior slightly and then slid laterally to an open position(s) via one or more track(s). Thus, it will be appreciated that the movable window panel or sheet is not flush with the fixed panels when in an opened position.

In certain example embodiments of this invention, the movable window sheet or panel is opened by a dual pull latch mechanism that may be selectively actuated by a user. When the opposed members of the dual pull latch mechanism are moved toward one another, they in turn cause a pair of respective spring loaded pins to move out of an aperture so that the movable window panel can be moved slightly toward the vehicle interior. The initial window movement toward the vehicle interior may, in certain example embodiments of this invention, be caused by a biasing force(s) applied by one or more seals. As the movable window panel is moved slightly toward the vehicle interior, the pins slide into respective tracks so that the panel can then be laterally slid into an opened position. In certain example embodiments, the tracks are mounted on the interior face of the fixed windows panels, so that the track structures function as both tracks for allowing window sliding and as structural supports for the fixed window panels or sheets.

In certain example embodiments of this invention, there is provided a flush-closing multi-panel window assembly for a vehicle, the flush-closing multi-panel window assembly comprising: first and second fixed window panels; a sliding window panel that is provided between the first and second fixed window panels when the sliding window panel is in a closed position, the sliding window being flush with the first and second fixed window panels when in the closed position; a seal carrier supported by the sliding window panel; and an injection molded bulb seal supported by at least the seal carrier, wherein the injection molded bulb seal extends around an entire periphery of the sliding window panel so as to cover gap(s) adjacent the edge of the sliding window panel.

In other example embodiments of this invention, there is provided a flush-closing multi-panel window assembly for a vehicle, the flush-closing multi-panel window assembly comprising: first and second fixed window panels; a sliding window panel that is provided between the first and second fixed window panels when the sliding window panel is in a closed position, the sliding window being flush with the first and second fixed window panels when in the closed position; first and second appliqués located above and below the sliding window panel when the sliding window panel is in the closed position; and wherein at least one of the first and second appliqués includes a main body portion comprising a first polymer based material and an abutting portion comprising a second polymer based material that is softer than the first polymer based material, wherein the abutting portion of the appliqué which comprises the softer material is located at an edge of the appliqué which abuts a corresponding edge of at least one of the fixed window panels.

In certain other example embodiments of this invention, there is provided a flush-closing multi-panel window assembly for a vehicle, the flush-closing multi-panel window assembly comprising: first and second fixed window panels; a sliding window panel that is provided between the first and second fixed window panels when the sliding window panel is in a closed position, the sliding window being flush with the first and second fixed window panels when in the closed position; an upper frame member and a lower frame member, each of the upper and lower frame members being attached to the first and second fixed window panels but not to the sliding window panel, and wherein each of the upper and lower frame members includes a track defined therein to allow for sliding of the sliding window panel; a latch assembly including first and second pins adapted to slide in tracks of the upper and lower frame members, respectively, during opening and closing of the sliding window panel; and wherein the latch assembly further includes first and second selectively actuatable members adapted to be moved toward one another by a user or any other suitable mechanism so that when the first and second selectively actuatable members are moved toward one another the first and second pins are caused to exit first and second apertures and/or cut-outs defined in the upper and lower frame members, respectively, and the sliding window panel can thereafter be slid laterally in order to open the sliding window panel.

In certain other example embodiments of this invention, there is provided a multi-panel window assembly for a vehicle, comprising: first and second fixed window panels; a sliding window panel that is provided between the first and second fixed window panels when the sliding window panel is in a closed position; at least one frame member attached to the first and second fixed window panels but not to the sliding window panel, and wherein the frame member includes a track defined therein to allow for sliding of the sliding window panel; a latch assembly including at least one pin adapted to slide in a track of the frame member during opening and closing of the sliding window panel; and wherein the latch assembly further includes first and second selectively actuatable members adapted to be moved toward one another by a user or any other suitable mechanism so that when the first and second selectively actuatable members are moved toward one another the pin is caused to exit an aperture and/or cut-out defined in the frame member and the sliding window panel can thereafter be slid laterally in order to open the sliding window panel.

BRIEF DESCRIPTION OF THE DRAWINGS

FIG. 7 is a bottom plan view illustrating the top frame member, including the tracks therein, of the window structure of FIGS. 1–6 according to an example embodiment of this invention.

FIGS. 8(a)–8(b) are plan views of an example finger grip portion which may be used in the window structure of FIGS. 1–7; FIG. 8(a) is a side plan view and FIG. 8(b) is a front plan view.

FIGS. 9(a)–9(b) are plan views of an example selectively actuatable pin which may be used in the window structure of FIGS. 1–7; FIG. 9(a) is a front plan view and FIG. 9(b) is a side plan view.

DETAILED DESCRIPTION OF EXAMPLE EMBODIMENTS OF INVENTION

Figure 1:
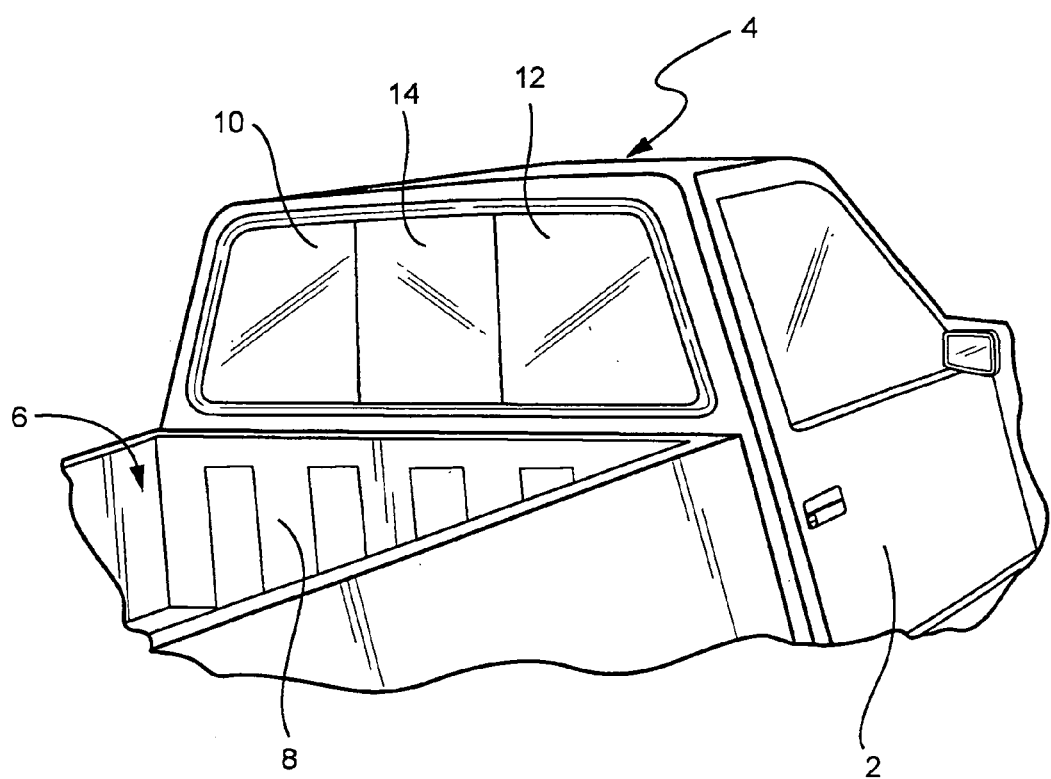
FIG. 1 is a perspective view of a rear window structure of a pick-up truck according to an example embodiment of this invention.

Referring now more particularly to the accompanying drawings in which like reference numerals indicate like parts throughout the several views.

Figure 15:
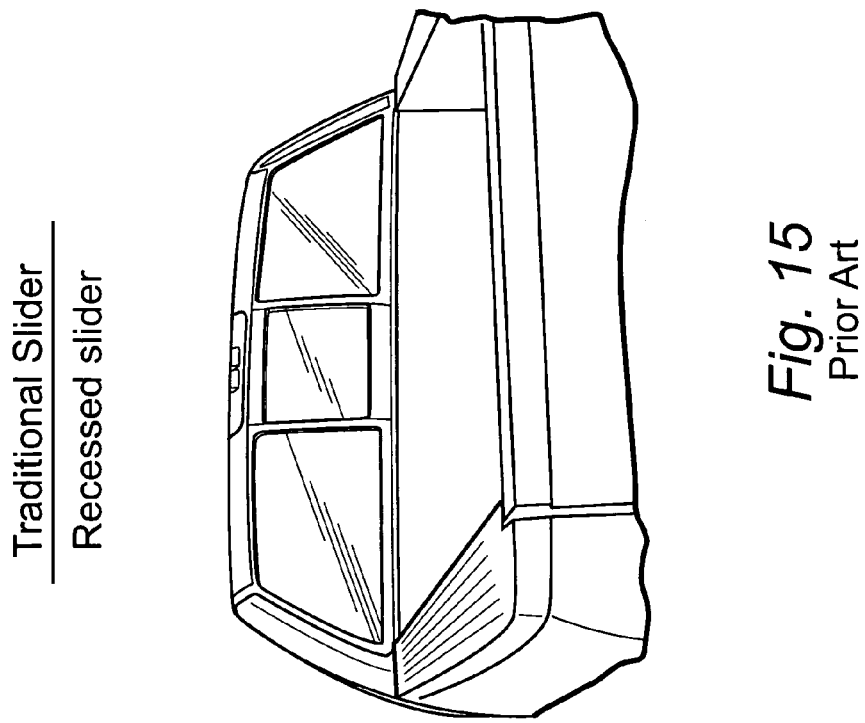
FIG. 15 is a view of a traditional slider window, for comparison purposes.

FIG. 1 is a view of a rear window structure of a pick-up truck according to an example embodiment of this invention. The pick-up truck includes front door 2, cab roof 4, and truck bed 6 at least partially defined by front bed wall 8. The window structure includes first and second fixed panels or sheets 10 and 12, and slidable/movable panel or sheet 14, all of which may be of or include glass, plastic, or the like. Each of panels or sheets 10, 12 and 14 may be substantially transparent for window viewing purposes according to certain example embodiments of this invention, and each may be entirely flat or slightly curved/bent in shape according to certain example embodiments of this invention. See also FIG. 14 (compared to FIG. 15) which illustrates a flush mounted slider system according to an example embodiment of this invention. Comparing FIG. 14 (flush profile) to the traditional recessed slider of FIG. 15, it can be seen that the flush profile of FIG. 14 has a smooth and flowing appearance compared to the choppy appearance of FIG. 15.

Figure 2:
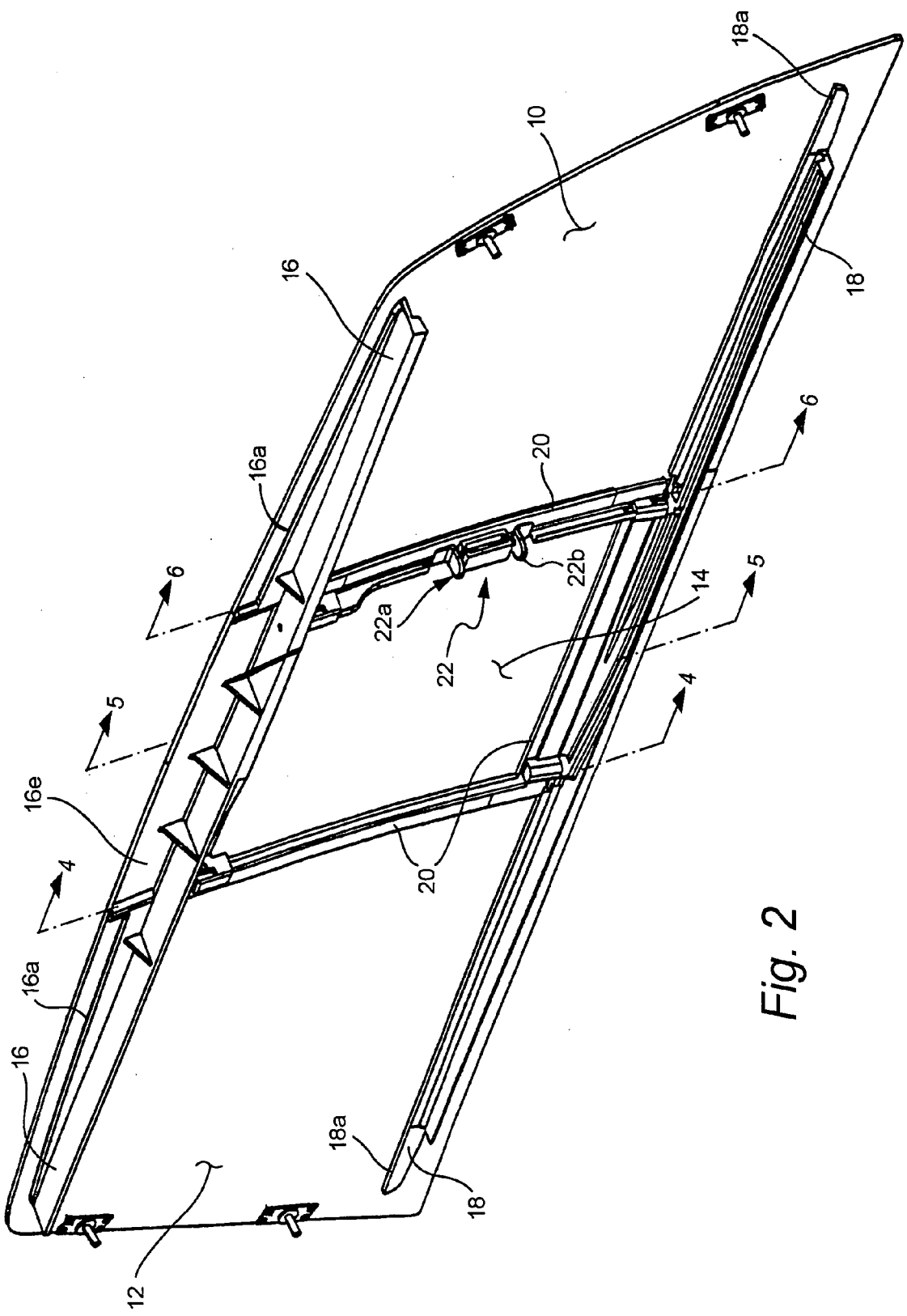
FIG. 2 is a perspective view of the window structure of FIG. 1 in the closed position, as viewed from the interior of the vehicle, according to an example embodiment of this invention.
Figure 3:
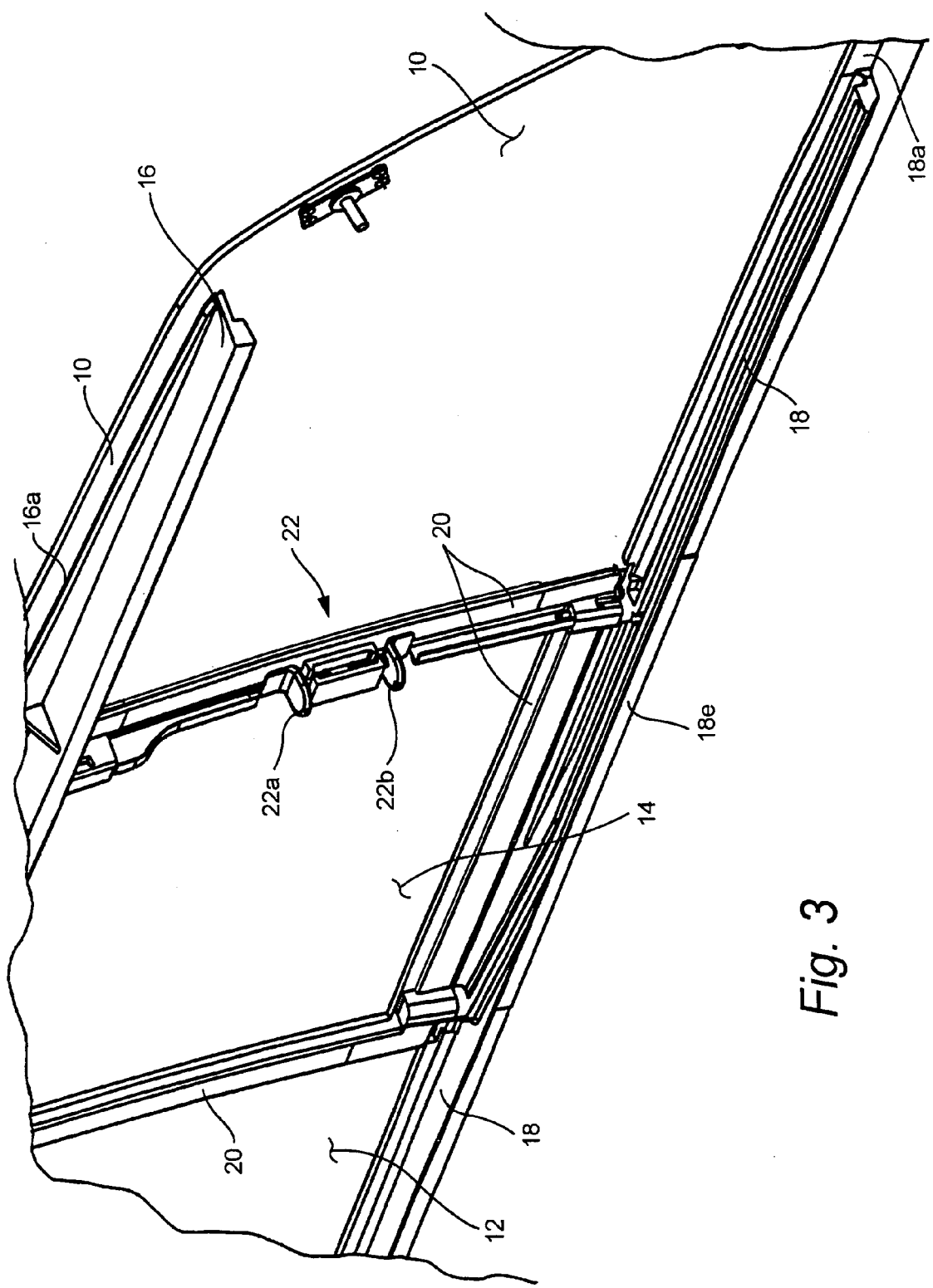
FIG. 3 is a close-up perspective view of a portion of the window structure of FIG. 2.

FIG. 2 is a detailed perspective view of the window structure of FIG. 1, as viewed from the interior of the truck cab, and FIG. 3 is an enlarged perspective view of certain aspects of FIG. 2. FIGS. 2–3 illustrate the slidable/movable window panel or sheet 14 in the closed position, between the fixed window panels 10 and 12, wherein the movable panel 14 is flush or substantially flush with the fixed panels 10, 12. The window structure includes top frame 16, bottom frame 18, seal carrier 20 which is attached around at least part of the periphery of movable panel 14, and latch assembly 22 which is used to allow slidable window panel 14 to be moved from a closed position to an opened position. The latch assembly 22 also locks the panel 14 in the closed position when this is desired. Fixed panels 10 and 12 are approximately the same size in certain example embodiments of this invention, whereas movable panel 14 may have a height smaller than that of panels 10, 12 in certain example embodiments of this instant invention.

Figure 4:
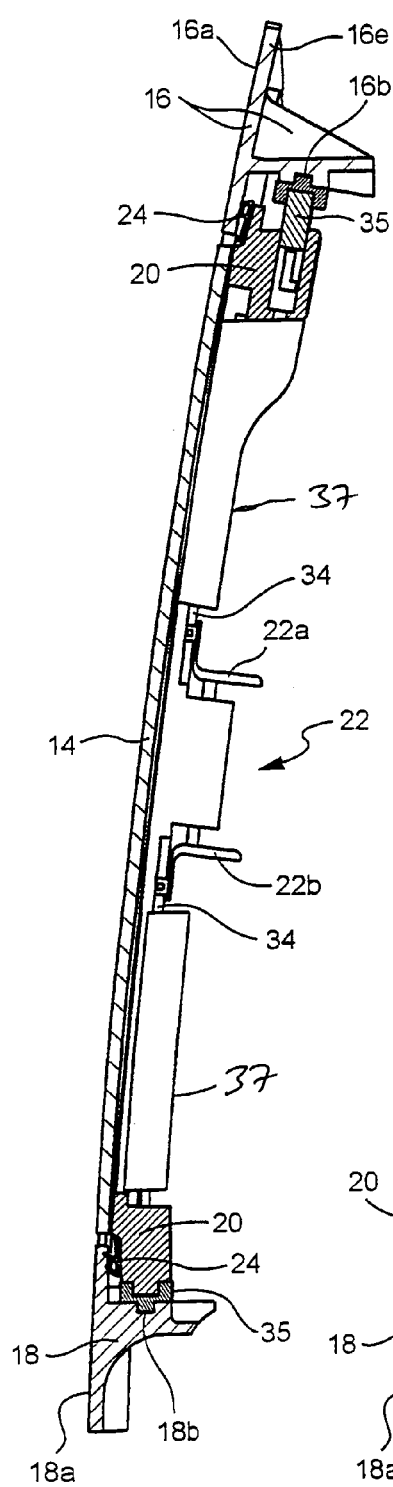
FIG. 4 is a cross sectional view of the window structure of FIG. 2 in the closed position, taken along section line 4—4 shown in FIG. 2.
Figure 5:
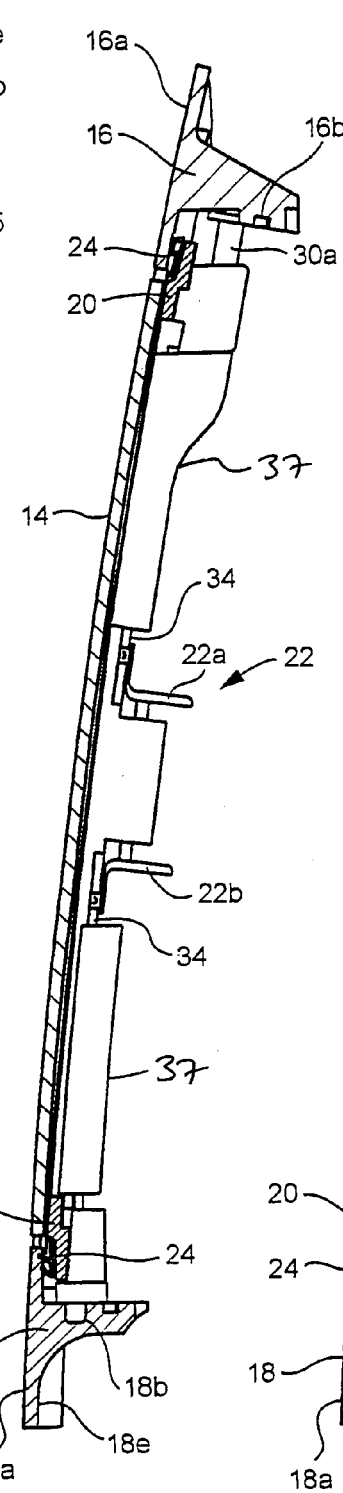
FIG. 5 is a cross sectional view of the window structure of FIG. 2 in the closed position, taken along section line 5—5 shown in FIG. 2.
Figure 6:
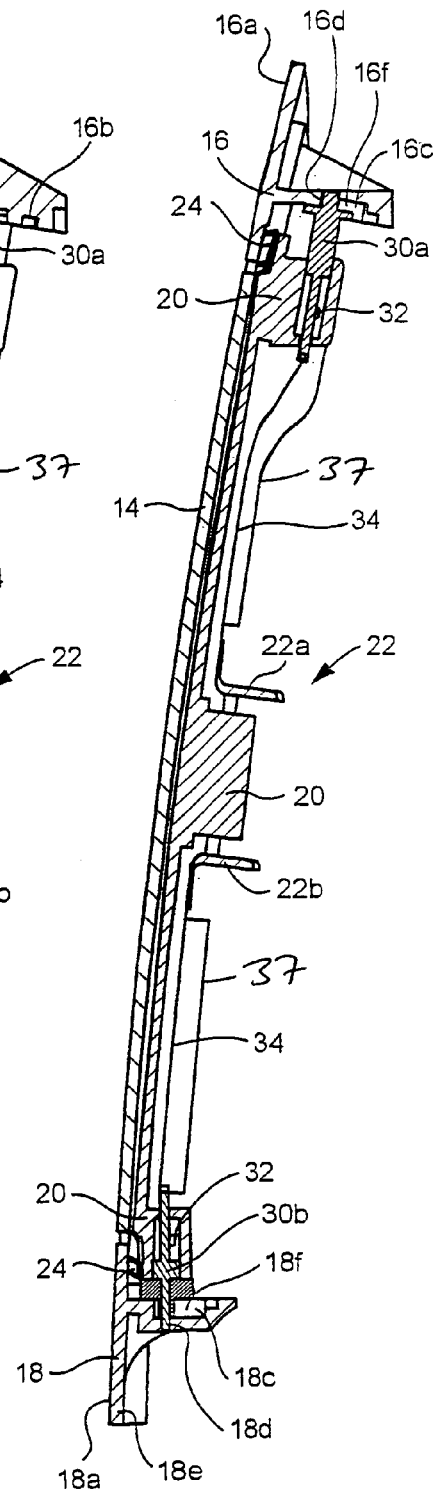
FIG. 6 is a cross sectional view of the window structure of FIG. 2 in the closed position, taken along section line 6—6 shown in FIG. 2.

FIGS. 4, 5 and 6 are cross sectional views of the window structure of FIGS. 2–3, taken along section lines 4—4, 5—5, and 6—6, respectively, shown in FIG. 2. Thus, FIGS. 4–6 illustrate the top frame 16, bottom frame 18, seal carrier 20 and latch assembly 22 in respective positions when the slidable panel 14 is in the closed position flush with the other panels 10, 12. FIG. 7 is a bottom plan view of the top frame 16, illustrating the tracks therein in which pins operative associated with the movable panel 14 slide during opening and closing of the movable panel 14 (the bottom frame 18 includes similar tracks).

Referring especially to FIGS. 2–7, the window structure according to an example embodiment of this invention will be described in more detail. Each of the top and bottom frames 16 and 18, respectively, include a substantially planar (planar or slightly curved) back portion 16a, 18a that is attached to a major surface of the fixed window panels 10 and 12 (but not to the movable panel 14). In other words, the substantially planar back portion 16a of top frame 16 is bonded to the major interior surface of each of fixed panel 10 and fixed panel 12 at a top portion of each panel via an adhesive or the like. Likewise, the substantially planar back portion 18a of bottom frame 18 is bonded to the major interior surface of each of fixed panel 10 and fixed panel 12 at a bottom portion of each panel via an adhesive or the like. Moreover, each of the top and bottom frames 16, 18 includes first and second tracks (16b, 16c, 18b, 18c) defined therein (to be described more fully below) which receive pins operatively associated with the latch assembly. Thus, it can be seen that both the top and bottom frames 16 and 18 function both as supports for fixed window panels 10 and 12, and also as track defining members which include tracks 16b, 16c, 18b, 18c that allow the slidable panel 14 to open and close in a sliding manner. The top and bottom frames 16 and 18 may be attached to the panels 10 and 12 in any suitable manner, including but not limited to via urethane adhesive, UV curable adhesive, encapsulation, double sided tape, or the like.

In certain embodiments of this invention, the movable panel 14 is smaller in height than the fixed panels 10, 12. Thus, in order to cover up voids arising from the smaller size of the movable panel 14, one or both frames may include filler or cover portions 16e, 18e (which may be referred to as appliqués in certain instances) which cover such voids. Appliques 16e and/or 18e may or may not be integrally formed with the frames 16, 18 in different embodiments of this invention. For example, appliqués 16e and 18e may be bonded to tracks or frames 16 and 18, respectively, in certain example embodiments of this invention so that the frames/tracks support the appliqués. Frames 16 and 18 may be formed of injection molded plastic, metal or any other suitable material in different embodiments of this invention. Appliques 16e, 18e are preferably of polymer based plastic material in certain example embodiments of this invention.

It can be seen best in FIGS. 4–6 that the top and bottom frames 16 and 18 are not attached to the central movable window panel 14. These frames 16, 18 are only attached to the fixed panels 10, 12 via adhesive or the like as explained above. As best shown in FIGS. 2–6 seal carrier 20 (but not frames 16, 18) is attached to the peripheral portion of movable window panel 14 via adhesive or the like. Thus, seal carrier 20 (but not frames 16, 18) moves/slides along with panel 14 when the panel is moved from the closed position to the opened position and vice versa. In certain example embodiments of this invention, as shown in FIGS. 2–6, seal carrier 20 is attached to panel 14 around all four peripheral sides thereof at or close to the edge of the panel. Moreover, a seal (e.g., bulb seal, finger seal, or the like) 24 is provided on the seal carrier 20 at a location where the seal carrier 20 and frames 16, 18 are immediately adjacent one another. Seal 24 functions to provide a weather seal between the movable seal carrier 20 and the fixed frames 16, 18. Flexible seal 24 may be of rubber or other polymer based material in certain example embodiments of this invention.

Dual pull latch assembly 22 is mounted on and/or supported by seal carrier 20. The latch assembly 22 includes first and second finger grip portions 22a, 22b which are adapted to be selectively squeezed together by a user, first and second spring loaded pin structures 30a, 30b operatively associated with the finger grip portions, biasing springs 32 which surround elongated portions of the pin structures as best shown in FIG. 9, and cables 34 which extend between and interconnect the finger grip portions 22a, 22b and the pin structures 30a, 30b. Cables 34 are covered by respective covers 37 as shown in FIGS. 4–6. Biasing springs 32 exert a biasing force which biases the pin structures 30a, 30b away from one another and into respective apertures or cut-outs 16d, 18d defined in the frames as best shown in FIG. 6 (the pin structures are in such as position when the panel 14 is in the closed position). In certain example embodiments of this invention, the spring loaded pins 32 are contained at least partially in the seal carrier 20 which is bonded to the center sliding glass sheet or panel 14.

When a user squeezes the finger grip portions 22a and 22b toward one another with his/her fingers, this causes the respective cables 34 to also move toward one another thereby pulling the pin structures 30a and 30b toward one another and out of apertures/cut-outs 16d and 18d, respectively, against the biasing force of springs 32. In certain other embodiments of this invention, cable(s) 34 may be replaced with elongated rods or other similar type component(s). When the spring loaded pin structures have been pulled from apertures/cut-outs 16d and 18d, respectively, then the panel 14 may be kicked or will pop inwardly toward the vehicle interior and then slid laterally in order to open the window as will be more fully described below.

In other example embodiments of this invention, the user need not actually touch members 22a, 22b in order to actuate the latch assembly 22. For example, another selectively actuatable mechanism (mechanical and/or electric) could be provided for causing members 22a, 22b or similar members to be moved toward one another in order to move the pins 30a, 30b from the locked position to the unlocked position. For example, a single flip or T-shaped handle lever cold be used to simultaneously move spring loaded pins 30a, 30b toward one another in order to move the pins from the locked position to the unlocked position to that the panel 14 could be opened.

As shown in FIGS. 2–3 and 6, latch assembly 22 is only provided on one side of the movable panel 14. Fixed pins 35 are attached to the other side of the movable panel (i.e., to the trailing side of panel 14 during opening) via seal carrier 20 as best shown in FIG. 4. Fixed pins 35 typically slide in tracks of the frames 16, 18, but are not movable relative to the seal carrier 20 and/or panel 14.

As example process for opening and closing with window will now be described with reference to FIGS. 2–9. This example process is provided for purposes of example only. FIGS. 2–6 illustrate the panel 14 in the closed position. In this position, the panel 14 is approximately and sometimes perfectly flush with fixed panels 10, 12. In the closed position shown in FIGS. 2–6, the movable panel 14 is flush with both the rear surfaces 16a, 18a of the frame portions immediately adjacent thereto, and also with the fixed panels 10, 12.

In the closed position, the biasing force of springs 32 presses pins 30 into respective apertures/cut-outs 16d, 18d defined in the frames 16, 18 thereby holding the panel 14 in place between the fixed panels 10, 12. When a user desires to open the window (i.e., move panel 14 into an opened position), the user from the vehicle interior squeezes finger grip portions 22a and 22b toward one another against the biasing force of springs 32. When finger grip portions 22a and 22b are moved toward one another, this in turn causes respective cables 34 and pins 30 to be moved toward one another, thereby causing ends of the pins 30 to be removed from apertures/cut-outs 16d, 18d defined in the frames 16, 18.

Once the ends of the pins 30 have been removed from the apertures/cut-outs 16d, 18d defined in the frames 16, 18, the movable panel 14 is shifted (or kicked-in) toward the vehicle interior. The force which causes at least one side of the panel 14 to be shifted toward the vehicle interior may be caused by biasing force generated by seals 24 against the frames 16, 18 and/or by pulling force on the latch assembly 22 generated by the user. In any event, when the panel 14 is shifted or kicked-in toward the vehicle interior, fixed pins 35 at one side of the panel substantially remain in place; but actuatable pins 30 at the latch side of the panel slide in guide channels 16f, 18f defined in the respective frames 16, 18 from apertures/cut-outs 16d, 18d toward the vehicle interior. Guide channels 16f, 18f are in communication with tracks 16c, 18c, respectively, and are generally oriented in a direction from about 45 to 90 degrees angled relative to tracks 16c, 18c. The upper and lower pins 30 slide in guide channels 16f, 18f, respectively, away from apertures/cut-outs 16d, 18d and into main tracks 16c, 18c defined in the frames.

After the upper and lower pins 30 have moved into main tracks 16c, 18c, the user slides the panel 14 laterally in order to open the same. As the panel 14 slides laterally, actuatable pins 30 slide in main tracks 16c, 18c and fixed pins 35 slide in tracks 16b, 18b. Eventually, tracks 16b and 18b may merge into main tracks 16c and 18c, respectively, as shown in FIG. 7 for example, so that the leading pins 30 and trailing pins 35 may travel in the same tracks. The panel 14 is thus opened in such a manner. In the opened position, the panel 14 is not flush with fixed panels 10, 12.

When it is desired to close the window, the user slides panel 14 back toward the opening defined between the fixed panels. As the panel is slid laterally toward the closed position, pins 35 will eventually make their way into tracks 16b, 18b, whereas pins 30 slide in tracks 16c, 18c. After the panel 14 has been slid to a position immediately adjacent the opening defined between the fixed panels, the panel 14 is pushed by the user away from the vehicle interior toward the truck bed so that pins 30 slide out of tracks 16c, 18c and through guide channels 16e, 18e against the biasing force of seals 24. When the panel 14 is pushed/pressed far enough in this direction, the ends of pins 30 finally are located over apertures/cut-outs 16d, 18d and the biasing force of springs 32 causes the ends of pins 30 to move into the apertures/cut-outs 16d, 18d thereby locking the panel 14 in the closed position.

FIGS. 8(a)–8(b) illustrate an example finger grip portion 22a (or 22b) which may be used in certain example embodiments of this invention. As can be seen, each grip portion 22a (or 22b) includes an approximately L-shaped portion. The finger grip portions includes an area 22c adapted to be pressed by a finger(s) of the use, a connection aperture 22d used for allowing the cable 34 to be connected to the finger grip portion, and an elongated structure or retaining shaft 22e adapted to be received in a corresponding aperture(s) defined in the seal carrier 20. In other example embodiments of this invention, finger grip portions 22a, 22b may be replaced with finger rings or any other suitable structure attached to cable(s) 34. Also, other shaped finger grip portions may be used in certain embodiments of this invention.

FIGS. 9(a)–9(b) illustrate an example pin structure 30 according to an example embodiment of this invention. The pin or pin structure 30 includes an end 30c adapted to slide in guide channels 16e, 18e and tracks 16c, 18c, and be received in apertures/cut-outs 16d, 18d. The pin or pin structure 30 also includes a first flange portion 30d, a shaft 30e with spring 32 provided around the same, and a connection aperture 30f defined proximate an end of shaft 30e. Such a pin shape is provided for example only, and is not intended to be limiting unless expressly claimed as with all other detailed disclosed herein.

Figure 11:
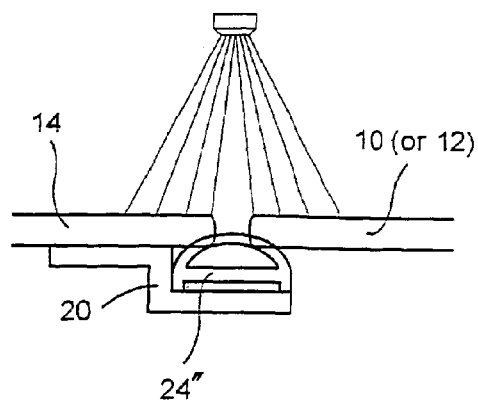
FIG. 11 is a cross sectional view of a bulb seal supported by a seal carrier that may be used in accordance with another embodiment of this invention.
Figure 12:
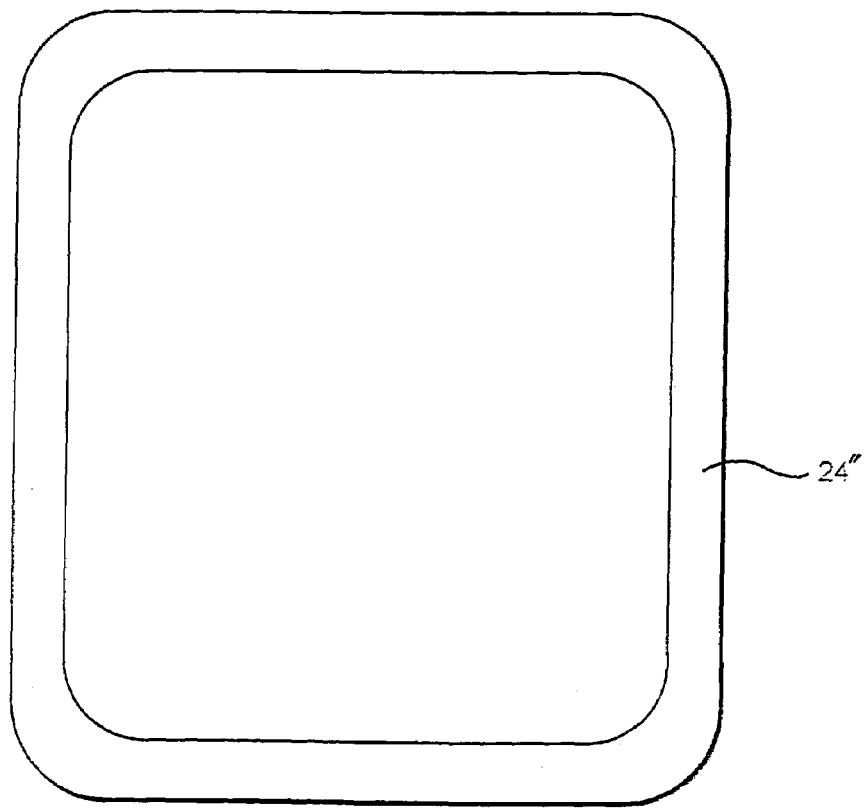
FIG. 12 is a top plan view of the bulb seal of FIG. 11.

Seal 24 is supported by the seal carrier 20 so as to provide a weather seal between the movable seal carrier 20 and the fixed frames 16, 18 and top and bottom portions of the movable panel 14. However, in certain example embodiments of this invention, seal 24 may be four-sided so as to be located around the entire periphery of movable panel 14. For example, FIGS. 11–12 illustrate such a four-sided seal 24" that is to be supported by the seal carrier 20 for sealing proximate all four sides of the movable panel 14.

While the seal 24 (or 24") may be formed by any suitable technique, in certain example preferred embodiments of this invention the seal is formed by injection molding as a hollow flexible seal member (i.e., bulb seal) to extend proximate the entire periphery of movable panel 14 and to be supported by seal carrier 20. Moreover, in certain example embodiments of this invention, this injection molded bulb seal 24 (or 24") is located so as to fill or cover the gap(s) between the movable panel 14 and the adjacent panel (10 and/or 12) as shown in FIG. 11. This allows the seal to form a water seal to prevent water from the exterior of the vehicle from making its way through the gap(s) between the movable panel 14 and the adjacent panel (10 and/or 12) as shown in FIG. 11.

This injection molded one-piece bulb seal 24" (e.g., supported by the seal carrier 20) is advantageous with respect to other seal types. For example, by filling or covering the gaps between the fixed and movable panels, the seal can prevent water from making its way into the vehicle interior through such gaps. Moreover, by forming this seal by injection molding into a one-piece type bulb seal, a better seal can be provided. Since injection molding is used to form the seal 24" in a one-piece manner, weld corners that can be present with other manufacturing techniques can be eliminated (weld corners are a weak point and can lead to leakage). Moreover, the use of injection molding to form a one-piece seal 24" allows the cross section of the seal 24" to be varied. For example, as shown in FIG. 12, the seal 24" can have a larger surface area at corner areas to provided adding sealing functionality at such areas. This is advantageous in that corner areas are typical seal failure points, and this technique allows for improved sealing at such areas. Seal carrier 20 may be made of or comprise polycarbonate (PC), polypropylene (PP), or any other suitable polymer based material in different embodiments of this invention.

Figure 13A:
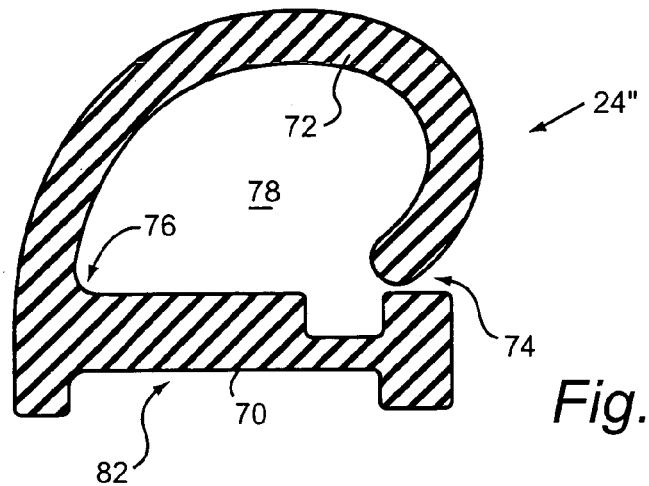
FIGS. 13(a)–13(c) are cross sectional views illustrating example steps for manufacturing the bulb seal of FIGS. 11–12 according to another example embodiment of this invention.
Figure 13B:
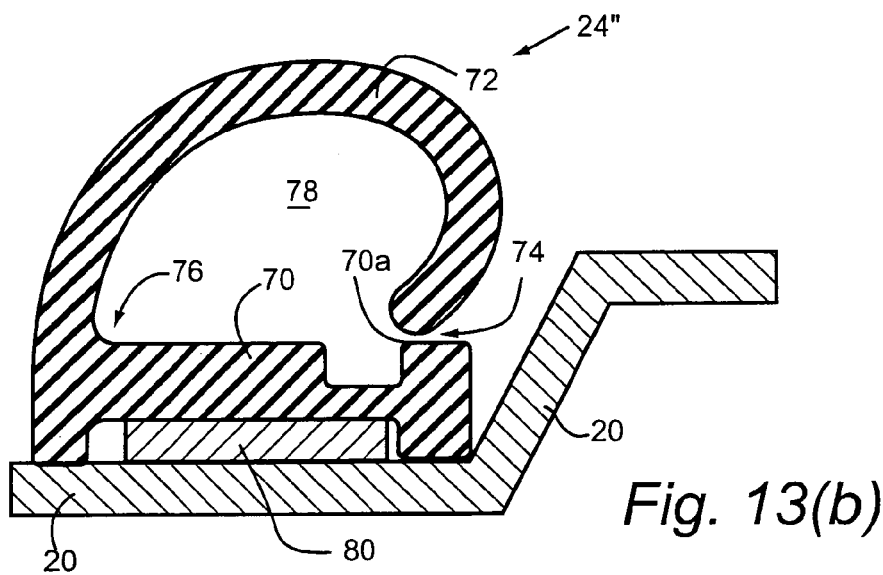
Figure 13C:
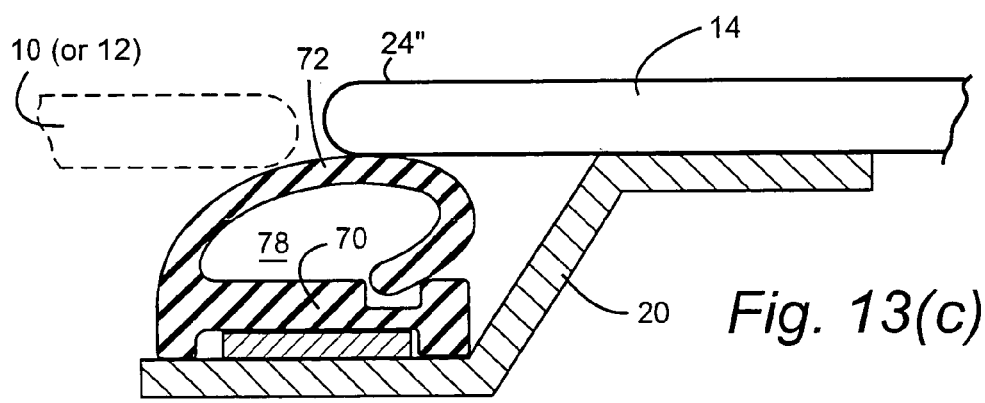

FIGS. 13(a)–13(c) illustrate an example technique for making bulb seal 24" according to an example embodiment of this invention. As previously discussed, this bulb seal 24" may be used in the manner shown in FIGS. 11–12. FIG. 13(a) is a cross section of the bulb seal 24" as formed by injection molding upon removal from the mold. The bulb seal 24" includes base 70 and curved flexible bulb or lip portion 72 which extends therefrom. The bulb or lip portion 72 includes two ends, the first end 74 being a distal end which is located proximate to but not physically connected to a top portion 70a of the base 70 so that a gap is provided therebetween when the lip portion 72 is in a relaxed unbiased state. The second end 76 of the bulb or lip portion is integrally formed with and attached to another end or side of base 70, so that a hollow cavity 78 is formed between the inner periphery of the lip or bulb portion 72 and the top surface of the base 70.

The bottom surface of the base 70 is attached to the seal carrier 20 via double-sided adhesive tape or any other suitable adhesive 80 as shown in FIG. 13(b). In the illustrated embodiment, the tape/adhesive 80 is located in a recess 82 formed ni the bottom surface of the base 70 as shown in FIGS. 13(a)–(b). In certain example embodiments of this invention, flexible bulb seal material for seal 24" may be made of or comprise an elastomer or compression set material (e.g., EPDM). This flexible bulb seal 24" may be four-sided as shown in FIG. 12 so as to extend around the entire periphery of movable panel 14. In such four-sided bulb seal 24" embodiments, the bulb seal 24" thus seals the gaps between the movable panel 14 and the fixed panels 10, 12, and may also seal the gaps between the movable panel 14 and the appliqués 16e, 18e and/or frames 16, 18. It can be seen in FIG. 12 that no welded corners or weld joints (which would be present if extrusion was used) are located at the four corner areas of the bulb seal 24", since the flexible bulb-portion of seal 24" (which does not include carrier 20) is injection molded so as to be continuously formed of one piece to extend around the entire periphery of the movable panel 14 (e.g., see panel 14 in FIG. 14).

FIG. 13(c) illustrates the bulb seal 24", supported by seal carrier 20, sealing the gap between movable panel 14 and the fixed panel(s) 10 and/or 12. When the bulb seal 24" is in sealing position, the lip or bulb portion 72 seals the gap between panel 14 and panel(s) 10/12, and the edges of the panel(s) bias the bulb or lip portion 72 toward the base 70 so that end 74 of the portion 72 contacts the base 70. Biasing of the bulb seal can work as discussed above, wherein the bulb seal 24" provides a biasing force against at least one of the upper and lower frame members so as to cause at least part of the sliding window panel to move toward an interior of the vehicle when the first and second selectively actuatable members or any other suitable member(s) are moved toward one another.

Figure 10:
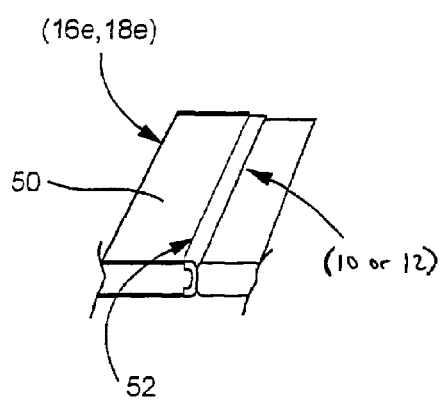
FIG. 10 is a perspective view of a dual durometer interface (DDI) between an appliqué and a fixed glass sheet according to an example embodiment of this invention.
Figure 14:
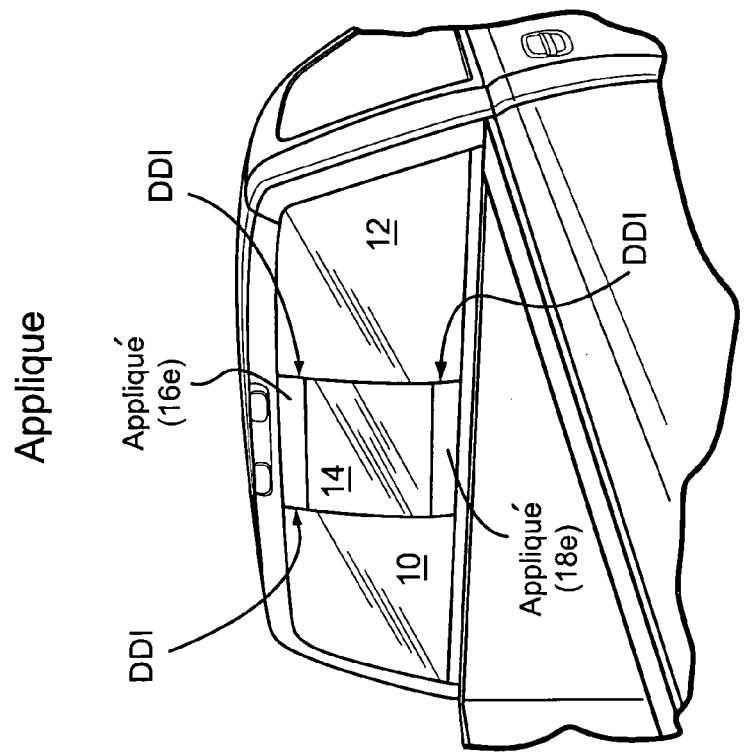
FIG. 14 is a view of a slider window according to an example embodiment of this invention.

FIGS. 10 and 14 illustrate another example embodiment of this invention related to the interface between fixed panel(s) 10 and/or 12 and adjacent appliqué(s) 16e and/or 18e. In particular, it has been found that the provision of a dual durometer interface (DDI) between the fixed glass and adjacent appliqué(s) is advantageous in certain example embodiments of this invention. FIG. 14 illustrates that this DDI may be provided at some or all of the interfaces between adjacent fixed panels (10, 12) and plastic appliqués (16e, 18e). In the FIG. 14 embodiment, there are four such locations where this DDI may be provided.

FIG. 10 is a close-up perspective view of a DDI interface according to an example embodiment of this invention. Fixed glass panel (10, 12) is located immediately adjacent to appliqué (16e, 18e), in an abutting fashion. It can be seen in FIG. 10 for example that an edge of a fixed panel (10 or 12) abuts an edge of the adjacent appliqué (16e or 18e). The appliqué (16e or 18e) includes both a polymer-based main body portion 50 and a softer more flexible edge portion 52, both of which are preferably of polymer based materials. In certain example embodiments of this invention, the edge abutting portion 52 is made of a softer and more flexible polymer based material than is main body portion 50 of the appliqué. Thus, the softer edge portion 52 of the appliqué is the portion of the appliqué which comes into abutting sealing contact with the fixed panel (10 or 12) as shown in FIG. 10. It has been found that the use of such a DDI interface between the appliqué and fixed panel(s) allows for a better weather seal to be formed therebetween so that leakage can be reduced. The dual durometer portions (i.e., plastic portions 50 and 52 of different hardnesses) can be made in any suitable fashion, such as via a two shot mold design.

The abutting portion 52 of softer material may be formed around the entire periphery of the appliqué in certain example embodiments of this invention, or alternatively may be located on one, two or three sides thereof in other embodiments. For example, in certain example embodiments, the abutting portion 52 of softer material may be located only at first and second opposite edges of the appliqué, in a spaced apart manner, so as to abut respective edges of first and second fixed window panels 10 and 12.

In certain example embodiments of this invention, the harder main body portion 50 of the appliqué may be made of a relatively hard polymer based material such as ASA, whereas the softer edge portion 52 of the appliqué may be made of a softer polymer based material such as EPDM. The material of portion 52 is much more compressible and flexible than the material of portion 50, so as to allow for improved sealing and manufacturing variation/tolerance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A flush-closing multi-panel window assembly for a vehicle, the flush-closing multi-panel window assembly comprising:

first and second fixed window panels;

a sliding window panel of the window assembly, the sliding window panel being provided between the first and second fixed window panels when the sliding window panel is in a closed position, the sliding window panel being flush with the first and second fixed window panels when in the closed position;

a seal carrier supported by the sliding window panel;

an injection molded flexible bulb seal supported by at least the seal carrier, wherein the injection molded bulb seal extends around an entire periphery of the sliding window panel so as to contact the sliding window panel and cover first and second gaps adjacent the periphery of the sliding window panel when the sliding window panel is in the closed position, the first gap being covered by the bulb seal being defined by and located between the sliding window panel and the first fixed window panel, and the second gap being covered by the bulb seal being defined by and located between the sliding window panel and the second fixed window panel, and wherein the seal carrier and the bulb seal are made of different materials and are not integrally formed with one another.

2. The flush-closing multi-panel window assembly of claim 1, further comprising:

an upper frame member and a lower frame member, each of the upper and lower frame members being attached to the first and second fixed window panels; and wherein each of the upper and lower frame members includes a track defined therein to allow for sliding of the sliding window panel;

a latch assembly including first and second spring biased pins adapted to slide in said tracks of the upper and lower frame members, respectively, during opening and closing of the sliding window panel; and wherein the latch assembly further includes first and second selectively actuatable members adapted to be moved toward one another so that when the first and second selectively actuatable members are moved toward one another the first and second pins are caused to exit first and second apertures or cut-outs defined in the upper and lower frame members, respectively, and the sliding window panel can thereafter be slid laterally in order to open the sliding window panel.

3. The flush-closing multi-panel window assembly of claim 2, wherein the bulb seal provides a biasing force against at least one of the upper and lower frame members when the sliding window panel is in the closed position.

4. The flush-closing multi-panel window assembly of claim 2, wherein the bulb seal provides a biasing force against at least one of the upper and lower frame members when the sliding window panel is in the closed position so as to urge at least part of the sliding window panel toward an interior of the vehicle when the first and second selectively actuable members are moved toward one another and the first and second pins are caused to exit said first and second apertures or cut outs.

5. The flush-closing multi-panel window assembly of claim 2, wherein the first and second selectively actuatable members each comprise an approximately L-shaped member.

6. The flush-closing multi-panel window assembly of claim 1, wherein the bulb seal includes only one piece that is supported by the seal carrier.

7. The flush-closing multi-panel window assembly of claim 1, wherein the bulb seal is made of a flexible elastomer material.

8. The flush-closing multi-panel window assembly of claim 1, wherein the bulb seal comprises a base portion that is integrally formed with a flexible lip portion, wherein one end of the lip portion is attached to the base portion and the other end of the lip portion is adapted to contact the base portion when the flexible lip portion is biased inwardly toward the base portion.

9. The flush-closing multi-panel window assembly of claim 8, wherein one of adhesive and tape is provided in a recess defined in the base portion for adhering the bulb seal to the seal carrier.

10. The flush-closing multi-panel window assembly of claim 1, wherein the bulb seal comprises a base portion that includes first and second recesses, the first recess for receiving an adhesive for bonding the bulb seal to the seal carrier and the second recess for receiving at least part of an end of a flexible lip of the bulb seal.

11. The flush-closing multi-panel window assembly of claim 1, wherein the bulb seal covers a third gap between the sliding panel and a first appliqué, and also covers a fourth gap between the sliding panel and a second appliqué, wherein the first and second appliqué are located on opposite sides of the sliding window panel.

12. The flush-closing multi-panel window assembly of claim 11, wherein the first and second appliqués are located above and below the sliding window panel, respectively.

13. A flush-closing multi-panel window assembly for a vehicle, the flush-closing multi-panel window assembly comprising:

first and second fixed window panels;

a sliding window panel of the window assembly, the sliding window panel being provided between the first and second fixed window panels when the sliding window panel is in a closed position, the sliding window panel being flush with the first and second fixed window panels when in the closed position;

a seal carrier supported by the sliding window panel;

an injection molded bulb seal supported by at least the seal carrier, wherein the injection molded bulb seal extends around an entire periphery of the sliding window panel so as to contact the sliding window panel and cover first and second gaps adjacent the periphery of the sliding window panel when the sliding window panel is in the closed position, the first gap being covered by the bulb seal being defined by and located between the sliding window panel and the first fixed window panel, and the second gap being covered by the bulb seal being defined by and located between the sliding window panel and the second fixed window panel;

an upper frame member and a lower frame member, each of the upper and lower frame members being attached to the first and second fixed window panels; and wherein each of the upper and lower frame members includes a track defined therein to allow for sliding of the sliding window panel;

a latch assembly including first and second spring biased pins adapted to slide in said tracks of the upper and lower frame members, respectively, during opening and closing of the sliding window panel;

wherein the latch assembly further includes first and second selectively actuatable members adapted to be moved toward one another so that when the first and second selectively actuatable members are moved toward one another the first and second pins are caused to exit first and second apertures defined in the upper and lower frame members, respectively, and the sliding window panel can thereafter be slid laterally in order to open the sliding window panel; and wherein the first and second pins are at least partially located in respective apertures defined in the seal carrier.

* * * * *